Dec. 15, 1931.  L. BARTELSTONE  1,836,785
APPARATUS FOR SPLICE LAMINATING GLASS
Original Filed July 27, 1926
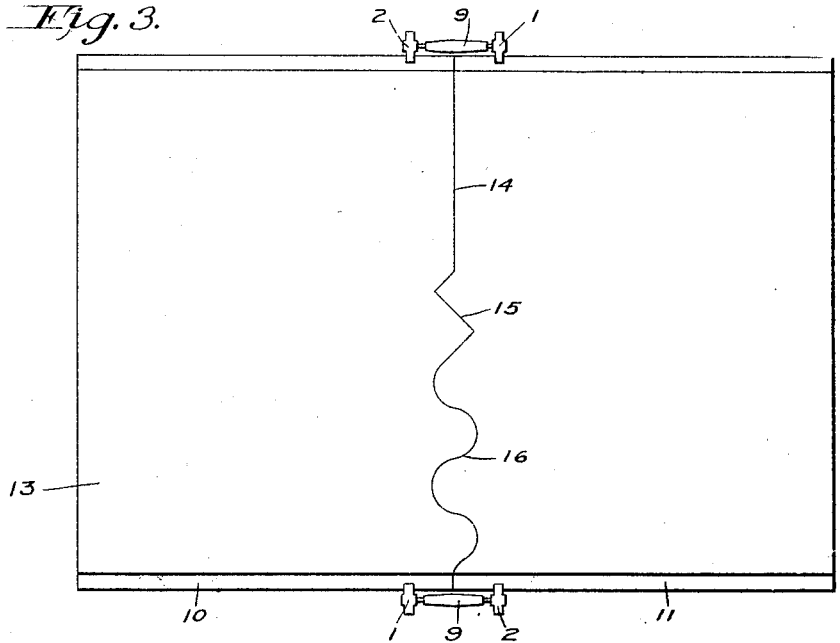
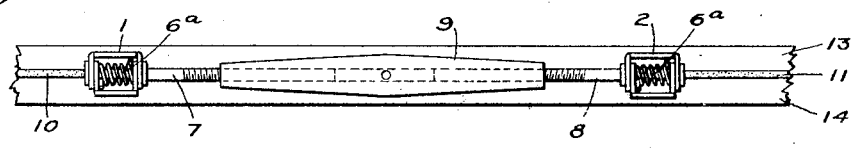
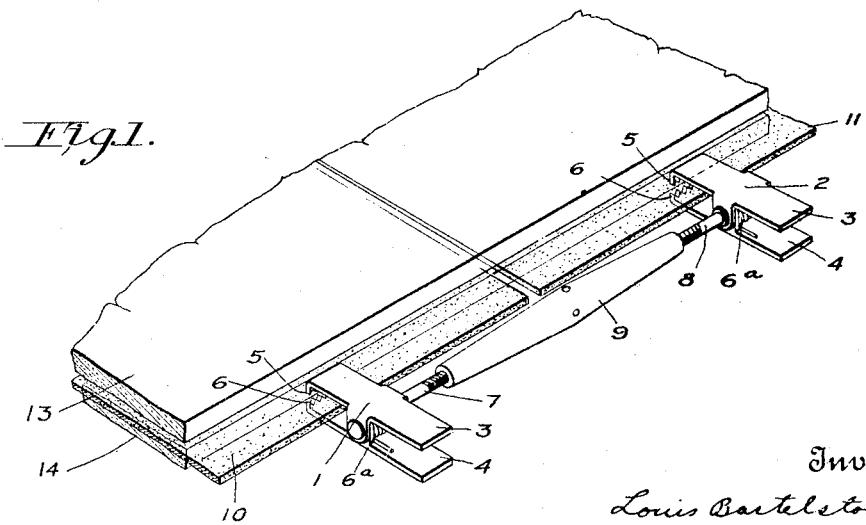
Inventor
Louis Bartelstone
By Attorneys
Nathan & Bowman Patented Dec. 15, 1931

1,836,785

UNITED STATES PATENT OFFICE

LOUIS BARTELSTONE, OF FLATBUSH, NEW YORK, ASSIGNOR, BY MESNE ASSIGNMENTS, TO ELBEE HOLDING CORPORATION, OF WILMINGTON, DELAWARE, A CORPORATION OF DELAWARE

APPARATUS FOR SPLICE-LAMINATING GLASS

Original application filed July 27, 1926, Serial No. 125,211. Divided and this application filed October 29, 1927. Serial No. 229,761.

This application is a division of my application for "Method splice-laminating glass", Serial No. 125,211, filed July 27, 1926, now Patent No. 1,666,252, dated April 17, 1928, and specifically relates to an apparatus for carrying out the method disclosed therein. Laminated glass usually consists of outer plates of glass and an intervening layer of sheet celluloid or other non-brittle transparent substance, the various layers being held together by an adhesive substance.

In the manufacture of this product, the inner face of the glass and the intervening sheet or sheets of celluloid are coated with the adhesive fluid and the assembled layers subjected to a pressure which serves to expel the excess uniting fluid thereby effecting a permanent union between the comparatively flexible celluloid and the outer glass plates. As many layers may be assembled in this manner as is desired. Of prime importance is the fact that the laminating must be so accomplished that the adhesion will be continuous and uniform and contain no imperfect or irregular regions to render it unsightly or interfere with its optical characteristics.

It often happens that the sheets of glass to be laminated are larger than available sizes of celluloid making it necessary that two or more sheets of the celluloid be joined to furnish the required size.

It has heretofore been common practice to join the adjacent edges of the celluloid before applying the glass plates but such an operation was difficult to accurately perform for the reason that if the adjoining edges of the sheets were bevelled off it was difficult to so join them as to result in a seam of even thickness or to secure a sufficiently strong and accurate seam if the abutting ends were squared off. If, on the other hand, the sheets were not previously joined then when the pressing operation took place the adhesive fluid would often be forced into the minute spaces between the edges of the adjoining sheets of celluloid causing them to spread and resulting in a product which was defective as to appearance, optical qualities and strength.

The apparatus disclosed herein is designed to overcome these difficulties and consists primarily in a means for drawing the abutting edges of the celluloid in close contact after the glass plates have been assembled in contact therewith and such apparatus further functions to positively and accurately hold the adjoining celluloid sheets in proper relation during the pressing operation.

The apparatus includes a pair of spring tensioned jaw members adapted to grip the corresponding marginal edges of the respective celluloid sheets. The jaw members are transversely mounted on screw bolts which are threadably engaged with an intervening turn buckle, actuation of which draws the opposing celluloid sheets into close abutting contact. The apparatus remains in this position during the application of pressure to the outer layers of glass and thereby prevents any separation of the abutting ends of the celluloid during such pressing operation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred construction of the apparatus and the manner in which it may be employed have been annexed as a part of this disclosure and, in such drawings, like characters of reference denote corresponding parts throughout all the views, of which:—

Figure 1 is a view in perspective of the novel device showing its application in a splice-laminating operation. Fig. 2 is a side elevation of Fig. 1 and Fig. 3 is a plan view thereof.

The apparatus includes a pair of gripping members 1 and 2, each including co-acting levers 3 and 4 having the inner co-acting saw teeth 5 and 6 respectively, such saw teeth being normally urged into contact by means of the torsional spring 6ª, and the outer ends of the levers 3 and 4 being adapted to be manually operated in opposition to the tension of the coil spring.

The gripping member 1 has its levers transversely mounted on the shaft 7. The gripping member 2 is similarly mounted on the bolt 8. The inner ends of these projecting bolt members 7 and 8 are threadedly engaged by the turn buckle hand grasp 9, the threads being right and left handed respectively whereby rotation of the hand grasp 9 longitudinally moves the bolts 7 and 8 relative to each other in the usual turn buckle manner. The gripping members 1 and 2 are shown applied to the outer marginal edges of the celluloid sheets 10 and 11 respectively, which sheets are located between the glass plates 12 and 13.

As shown by Fig. 2, the gripping members 1 and 2 and the turn buckle 9 are all of less thickness than the combined thickness of the glass plates and the intervening sheet of celluloid. Thus when the assembled but unsealed sheets are placed between the bed and platen of the press for the usual pressing operation the elements of the press will not engage the sheet gripping members.

Fig. 3 illustrates the manner in which a pair of clamping devices would ordinarily be used during the splice-laminating operation. The abutting edges of the celluloid sheets may be square and straight, as shown in Fig. 1 and in the upper portion of Fig. 3 at 14; or they may have co-acting saw teeth, as shown at 15; or curved adjoining surfaces as shown at 16. The abutting surfaces may in any case be either bevel or square, as desired.

The adjustable gripping means affords a device for very accurately positioning the abutting celluloid sheets and thereafter securely and rigidly holding the sheets in such position during the application of pressure to the outer layers of glass. Maintaining the celluloid sheets in this closely adjacent position prevents the entrance of the cementing fluid between the adjoining edges. The resulting product presents a very even and hair line seam, which is thereby a superior product in appearance and is more optically perfect. The surface is not rendered uneven by overlapping edges of the celluloid, nor is the product weakened by the intervening edges having become slightly separated.

The apparatus is easily and quickly applied and may thereafter be rapidly and accurately adjusted, it being especially adapted for the operation disclosed by reason of its arrangement whereby it may be applied solely to the outer projecting or marginal edges of the celluloid and thereby not interfere with the application of the glass plates to the central portion overlying the joint between the celluloid sheets.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A device for abutting sheets of non-brittle material and holding them in contact during a splice-laminating operation comprising two sheet-gripping members each consisting of a rod, a pair of sheet metal levers extending transversely therefrom, the outer end of said rod forming a supporting bearing upon which said levers are hinged, the adjacent ends of said levers, on one side of the rod, being provided with opposed jaws affording teeth adapted to grip the margin of a sheet, the opposite ends of said levers serving as manual operating means for opening said jaws, and spring tension means for normally closing the jaws; and screw threaded means for effecting longitudinal movement of the rods relative to each other to draw the adjacent ends of the sheets into abutting position, the over-all thickness of said device being less than the thickness of the laminated product.

2. A device for abutting sheets of non-brittle material and holding them in contact during a splice-laminating operation, comprising two sheet gripping members, each consisting of a pair of substantially parallel spring pressed levers pivoted together intermediate their ends, one end of said levers comprising sheet gripping jaws and the other end comprising means for opening said jaws; a threaded rod for each of said pairs of levers extending axially through the pivots of the respective members and forming a hinge bearing therefor, said rods projecting outwardly toward each other; and a rotatable member having a threaded engagement with the opposed ends of said rods whereby rotation of said rotatable member will effect relative bodily movement between said gripping members and thereby relative abutting movement between said sheets.

In witness whereof, I have hereunto subscribed my name.

LOUIS BARTELSTONE.